United States Patent Office 3,539,322
Patented Nov. 10, 1970

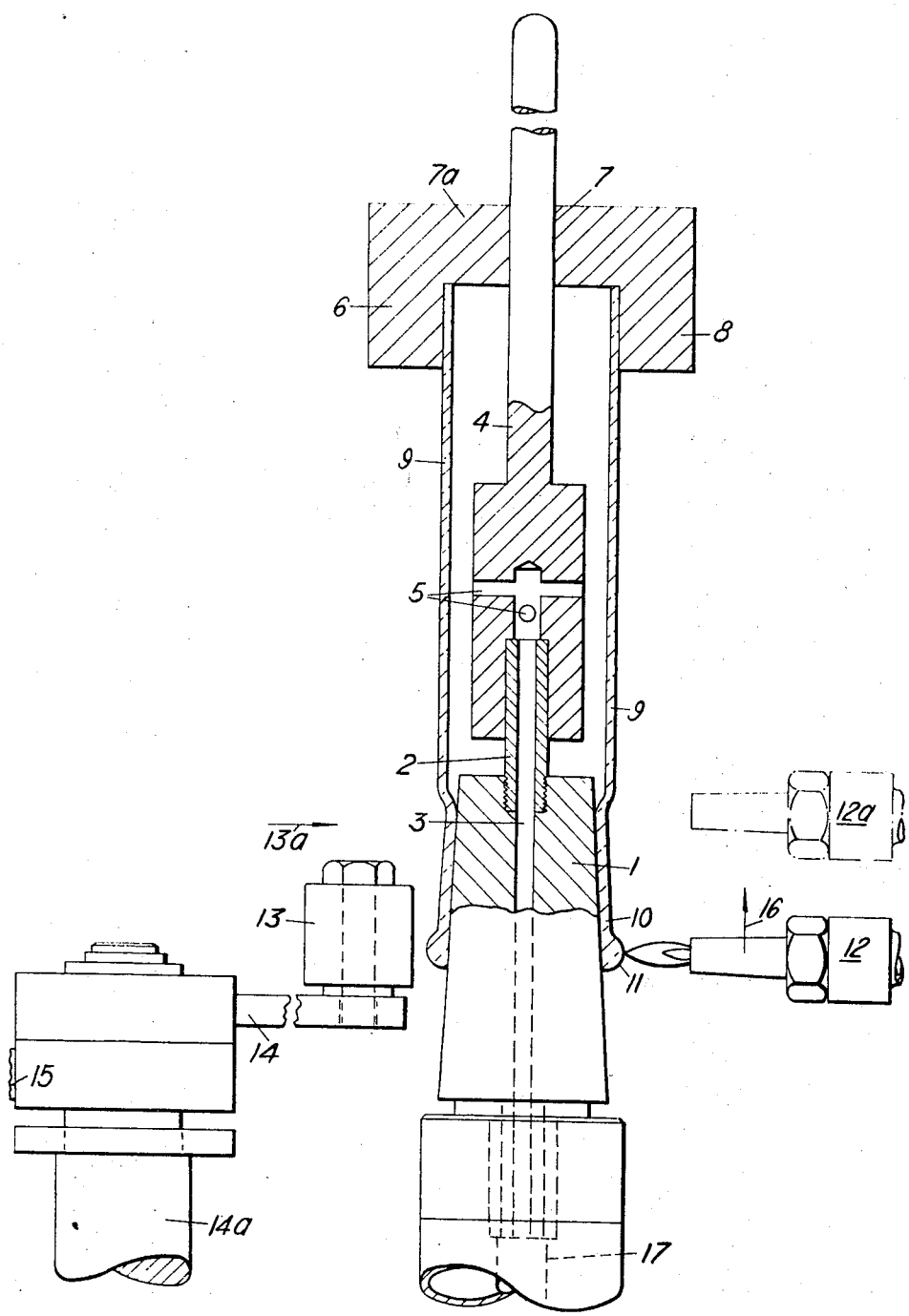

3,539,322
METHOD AND APPARATUS FOR PRODUCING AN INTERNAL PRECISION SEALING SURFACE IN HOLLOW GLASS BODIES
Donald Curtis, Stone, England, assignor to Quickfit & Quartz Limited, Stone, England, a corporation of Great Britain
Filed Mar. 25, 1968, Ser. No. 715,661
Claims priority, application Great Britain, Mar. 23, 1967, 13,818/67
Int. Cl. C03b 21/00
U.S. Cl. 65—108                                      10 Claims

ABSTRACT OF THE DISCLOSURE

An internal precision sealing surface is developed in a hollow vitreous body, e.g. a hollow glass tubular body, by supporting a body by means of a resilient material secured to the upper part of a spindle, each of which being disposed vertically coaxially above a mandrel, and heating the sealing surface while applying suction to the interior of the body so that the sealing surface is symmetrically applied to the mandrel.

BACKGROUND OF THE INVENTION

1.—Field of the invention

This invention relates to a method of forming a hollow vitreous body with an internal precision sealing surface in a predetermined location, especially the formation of an internal precision sealing surface of frusto-conical form.

2.—Description of the prior art

It has heretofore been proposed to provide a precision sealing surface on the interior of a hollow glass body by applying the hollow glass body onto a mandrel having an external surface conforming to the precision surface desired to be produced on the hollow body, heating the mandrel and the exterior face of the glass body where it surrounds the mandrel and applying suction to the interior of the hollow body to cause the sealing surface to succumb to the different pressure and adopt the smooth surface of the mandrel face.

In operating on a hollow glass body the latter is mounted on a lathe so that one end of the body is rotated by a chuck while the other end is mounted on a suitable mandrel carried by the headstock and the flame applied to the exterior sealing surface traverses the latter in a direction opposite to the direction of outflow from the hollow body when suction is applied to the interior thereof.

A main object of the present invention is to avoid the generation or presence of faces tending to induce asymmetry in the precision surface, e.g. due to bending moments arising.

SUMMARY

The present invention comprises a method of developing in a hollow glass body an internal precision sealing surface from a sealing surface of approximately precision smoothness, characterised by supporting the hollow vitreous body to present the sealing surface of approximate precision smoothness to a vertically mounted mandrel by relative axial displacement, said mandrel having an external configuration corresponding to the internal precision sealing surface to be produced inside the hollow vitreous body, heating the rim of the sealing surface of the body and producing intimate contact between the heated rim and the mandrel, applying suction through the mandrel to the interior of the hollow vitreous body on the mandrel, and supplying sufficient heat to the exterior wall of the sealing surface so that said sealing surface is symmetrically applied to the mandrel by the difference in pressures derived from the suction effect to form a precision sealing surface.

A preferred method according to the invention is characterised by supporting the hollow glass body to present the sealing surface of approximate precision smoothness to a mandrel mounted to be rotatable about a vertical axis, said mandrel having an external configuration corresponding to the internal precision sealing surface to be produced inside the hollow glass body, presenting the sealing surface of the hollow glass body to the mandrel by relative axial displacement, rotating the mandrel and the hollow glass body, heating the rim of the sealing surface of the body as the body is rotated with the mandrel and progressively pressing the heated rim of the sealing surface into intimate contact with the mandrel, applying suction through the mandrel to the interior of the hollow glass body on the mandrel and supplying sufficient heat to the exterior wall of the sealing surface, so that said sealing surface is symmetrically applied to the mandrel by the difference in pressures derived from the suction effect to form a precision sealing surface.

In a preferred manner of carrying out a method according to the invention as applied to the formation of a precision sealing surface on a tubular glass body, the mandrel supports a coaxial spindle, said spindle carrying a rubber block recessed for snugly receiving the end (the upper end) of a hollow glass body remote from the end with the preformed sealing surface, whereby the hollow glass body suspended in the rubber block carried on the spindle is lowered onto the mandrel, the mandrel being provided with an axial extension adapted to make a driving fit with the spindle.

The external surface of the mandrel may be of frusto-conical form so that the interior precision sealing surface formed on the hollow body is of greatest diameter at the rim and of least diameter at the upper end of the sealing surface.

The present invention also comprehends apparatus for implementing the method of operating on a hollow body as hereinbefore described, said apparatus comprising a mandrel having an external configuration desired to be imparted to a heated inner sealing surface of approximately precision smoothness of a hollow glass body when the sealing surface is located coaxially on the mandrel and an axial bore, a centre pin having a bore to register with the bore in the mandrel, said pin being mounted on the mandrel, a spindle of which the lower part is hollow to fit over the centre pin and interlock therewith to be driven as an assembly when the mandrel is rotated, said spindle having radial bores in the lower part extending through the wall of the spindle said spindle being adapted to support the upper end of the glass body when its sealing surface is located on the mandrel, means for heating the rim of the exterior face of the glass body surrounding the sealing surface and means for producing intimate contact between the heated rim and the mandrel, and suction means for applying suction through the mandrel, the centre pin and the lower part of the spindle, to the interface between the mandrel and the juxtaposed inner sealing surface of the tubular body.

Preferably the intimate contact is produced by pressing means for applying the rim of the heated sealing surface to the mandrel.

If the precision sealing surface is being formed on the tubular part of a hollow body closed at one end such as a flask, the hollow body may be supported by its base nesting on the upper end of the spindle when the sealing surface is surrounding the mandrel. Similar conditions of support may be provided by the spindle if the sealing surface is being formed at the mouth of a test tube.

Where, however, the tubular body is a tubular body open at both ends, apparatus according to the invention comprises a support for the tubular body carried by the spindle is constructed so as to seal the upper open end of the tube in order that suction effect may be efficiently effected in the vicinity of the mandrel.

From this aspect, apparatus constructed according to the present invention comprises a recessed compressible block secured to the spindle for axial adjustment thereon, the internal diameter of the recess being such as to tightly embrace the wall of the tubular body and seal the outer end thereof, so that on centering the spindle on the centre pin the tubular body is coaxially located on the mandrel to have precisely imposed on its interior sealing surface the exact shape of the external configuration of the mandrel.

BRIEF DESCRIPTION OF THE DRAWINGS

The figure is a central sectional elevation, partly in section, through apparatus for forming a precision sealing surface.

DESCRIPTION OF THE PREFERRED EMBODIMENT

In order that the operation of forming a precision sealing surface on one end of a tube according to the invention may be more clearly understood, the employment of the method in a preferred form of apparatus will now be described, by way of example.

As shown in the drawing, apparatus according to the invention comprises a driven mandrel 1 provided with an exterior forming surface of frusto-conical shape, which shape gives the configuration which it is desired to produce as an internal precision sealing surface in a tubular glass body.

On the tapered mandrel 1 is mounted a coaxial cylindrical centre pin 2 and both the mandrel 1 and the centre pin 2 have a central bore 3 through which suction may be applied to the interior of the tubular body in the vicinity of the sealing surface, when the tubular body is applied to the mandrel as hereinafter described.

In order to support the tubular body in desired location on the mandrel, a supporting spindle 4 is mounted as a sliding fit on the centre pin 2. To this end, the lower end of the spindle is turned to produce the required fit on the centre pin 2 and above the top of the pin the bore formed in the spindle 4 by the turning operation is provided with ports 5 at right angles to one another, each opening through the wall of the lower hollow end of the spindle, so that if suction is applied through the central bore 3 of the mandrel and the centre pin, the suction is applied through the bore in the spindle above the top of the centre pin and through the bores 5 into the annulus between the spindle and a tubular body placed on the mandrel to be operated on, so that suction applied through the mandrel is immediately effective in the vicinity of the interface between the mandrel and the surrounding tube wall.

The spindle 4 carries a compressible rubber block 6 which is axially apertured as indicated at 7 through which aperture the spindle 4 extends as a tight fit. The block 6 comprises an upper part 7a which is apertured so that the spindle 4 is gripped by the block 6 and a lower part 8 which is recessed to embrace and suspend the tubular body whilst the part 7a of the block seals the upper end of the tubular body.

The tubular body is indicated at 9, and as clearly shown in the drawing, the end of the body 9 is formed with a sealing surface 10 which is an interior sealing surface of approximate precision smoothness such that a fine symmetrical annular clearance between the rim 11 of the interior sealing surface of the tube and the exterior surface of the mandrel 1 obtains when the tube 9 is lowered onto and initially located on the mandrel 1, i.e. after fitting the upper end of the tube into sealing position in the block 6 set precisely on the spindle 4, thereby the locating occurs without excess pressure on the tubular body.

In order that suction may be applied to the interior of the tube 9 it is first necessary to form a "ring seal" between the rim 11 of the tubular body and the mandrel 1.

This is achieved by heating the rim, for example, by means of a flame emanating from a burner indicated at 12 after the mandrel has started rotating so that the rim is uniformly heated as it progresses in its rotation in front of the burner 12. The flame may be derived from a supply to the burner 12 of oxy-coal gas, oxy-propane gas or other similar fuel gas available at a supply main.

To minimise the period of time taken in pressing the rim 11 to the mandrel, the neck end may be preheated before applying the tubular body to the compressible block 6. Indeed, in accordance with the present invention it is preferable to apply the tube 9 to the spindle 4 immediately after the neck forming operation is completed and the approximate sealing surface produced, thereby the residium heat in the neck end is available to accelerate the formation of the precision surface as hereinbefore described.

Accordingly, from the apsect of the invention it is unnecessary to provide special means for heating the mandrel, since each operation brings heat to the mandrel by the pretreatment of the glass body and there is also the action of the flame on the rim 11.

When the rim is sufficiently soft, a roller 13 is swung horizontally against the rim to press the rim into intimate contact with the mandrel in the direction indicated by the arrow 13a.

The roller 13 is conveniently mounted on an arm 14 swingable about a post 14a, and actuation can be achieved through the agency of an arm, part of which is indicated at 15, which arm can be manually operated to cause the roller 13 to operate on the rim 11 of the tubular body.

The ring seal having been formed at the outer extremity of the sealing surface, the suction line is opened to the interior of the tubular body 9 and suction is then applied through the bore 3 of the mandrel 1 and centre pin 2 and through the lower part of the spindle via the ports 5. Thus the suction effect is applied to the interior of the tubular body in the vicinity of the interface between the tubular body and the mandrel.

As soon as suction is applied, the burner 12 is utilised to heat the external face of the sealing surface 10 to assist the tubular body in adopting the surface of the mandrel. To this end the burner 12 is caused to traverse the exterior surface immediately above the rim 11 in the direction of the air flow induced by the suction, so that the conformation of the sealing surface to the precise overall form of the mandrel is progressively upwards from the rim 11, the direction of movement of the burner in this part of the operation being indicated by the arrow 16, so that the burner moves into the phantom line position 12a indicated on the drawing.

The mandrel 1 herein described, which is preferably driven by an axial member 17 which is part of a flexible drive actuated by a suitable motor (not shown), is formed of a stainless steel having a suitable coefficient of expansion sensibly greater than that of the glass, as for example that stainless steel available on the open market under the Registered Trade Mark "INCONEL," thereby the facility of the mandrel to contract at a quicker rate than the glass affords an automatic means of releasing the glass from the mandrel when the operation of forming the internal precision surface is completed.

By employing the method of operation described, undesirable bending moments cannot be generated during the rotation of the glass body and unnecessary axial pressure to retain the glass body on the mandrel is avoided. Accordingly, completely symmetrical application of the sealing surface of approximately precision smoothness is applied to the smooth surface of the mandrel and an immaculate precision sealing surface produced.

I claim:

1. A method of developing an internal precision sealing surface in a hollow vitreous body having an inner sealing surface of approximately precision smoothness, comprising presenting said sealing surface of the hollow vitreous body in coaxial relation with a vertically mounted mandrel beneath said vitreous body by relative axial displacement, said mandrel having an external configuration corresponding to the internal precision sealing surface to be produced inside the hollow vitreous body, sealingly supporting the upper end of the hollow vitreous body by means of a body of resilient material secured to the upper part of a spindle said upper end and said spindle being disposed vertically above the mandrel in coaxial relation therewith and said spindle having its lower part fitted over a centre pin mounted on the upper part of the mandrel, heating the rim of the exterior face of the hollow vitreous body surrounding the sealing surface and producing intimate contact between the heated rim and the mandrel, applying suction through the mandrel, the centre pin and the lower part of the spindle to the interior of the hollow vitreous body on the mandrel, and supplying sufficient heat to the exterior wall of the sealing surface so that said sealing surface is symmetrically applied to the mandrel by the difference in pressures derived from the suction effect to form a precision sealing surface.

2. Method according to claim 1, wherein the hollow vitreous body is made of glass.

3. Method according to claim 1, further comprising rotating the mandrel, the centre pin, the spindle, the body of resilient material and the hollow vitreous body as an assembly.

4. Method according to claim 1, wherein the hollow vitreous body is a tube open at both ends and wherein said body of resilient material is employed to seal the adjacent end of the tubular vitreous body.

5. Method according to claim 1, wherein the heated rim surrounding the sealing surface of the hollow vitreous body is pressed progressively into intimate contact with the mandrel.

6. Method according to claim 1, wherein heat is applied to the exterior wall of the sealing surface from the rim upwardly, whereby the sealing surface is gradually fitted onto the mandrel to form the precision sealing surface.

7. Apparatus for developing an internal precision sealing surface in a hollow vitreous body, comprising a vertically mounted mandrel having an axial bore and an external configuration desired to be imparted to a heated inner sealing surface of approximately precision smoothness of a hollow vitreous body when the sealing surface is located coaxially on the mandrel, a centre pin having a bore to register with the bore in the mandrel, said pin being mounted on the upper part of the mandrel, a spindle disposed vertically above the mandrel in coaxial relation therewith, the lower part of the spindle being hollow to fit over the centre pin and having radial bores communicating with said bore in the centre pin and extending through the wall of the spindle, a body of resilient material sealingly secured to the upper part of the spindle for sealingly supporting a hollow vitreous body in coaxial relation above the mandrel to have precisely imposed on its inner sealing surface the exact shape of the external configuration of the mandrel, means for heating the rim of the exterior face of the hollow vitreous body surrounding the sealing surface and means for producing intimate contact between the heated rim and the mandrel, and suction means for applying suction through the mandrel, the centre pin and the lower part of the spindle to the interface between the mandrel and the juxtaposed inner sealing surface of the hollow vitreous body.

8. Apparatus according to claim 7, including a device for pressing the heated rim of the heated sealing surface against the mandrel.

9. Apparatus according to claim 7, wherein the hollow vitreous body is a tube open at both ends, and the body of resilient material is recessed in its underside and is secured to the spindle for axial adjustment thereon, the internal diameter of the recess being such as to tightly embrace the wall of the tubular vitreous body and to seal the adjacent end thereof.

10. Apparatus according to claim 7, further comprising means for rotating the mandrel about a vertical axis and wherein said mandrel, said centre pin, said spindle and said body of resilient material are interfitted so that they are driven as an assembly when the mandrel is rotated.

References Cited

UNITED STATES PATENTS

| | | | |
|---|---|---|---|
| 3,332,764 | 7/1967 | Knox | 65—110 |
| 3,362,435 | 1/1968 | Meyer | 65—110 |
| 3,368,588 | 2/1968 | Meyer | 65—110 |
| 3,427,143 | 2/1969 | Deery et al. | 65—110 |
| 3,449,105 | 6/1969 | Dieman et al. | 65—298 |

S. LEON BASHORE, Primary Examiner

E. R. FREEDMAN, Assistant Examiner

U.S. Cl. X.R.

65—109, 110, 276, 277, 292, 296